United States Patent

Young et al.

[11] Patent Number: 6,002,937
[45] Date of Patent: Dec. 14, 1999

[54] METHOD OF AND APPARATUS FOR COMMUNICATING INFORMATION SIGNALS

[75] Inventors: Jason Terrill Young, Coral Springs, Fla.; Sybren Daniel Smith, Fox Lake, Ill.; Richard Snead Camden, Deerfield Beach, Fla.

[73] Assignee: Motorola, Inc., Schaumburg, Ill.

[21] Appl. No.: 08/740,632

[22] Filed: Oct. 31, 1996

[51] Int. Cl.⁶ .................................................. H04Q 7/20
[52] U.S. Cl. .......................................... 455/462; 455/74.1
[58] Field of Search .................................... 455/74.1, 462, 455/464, 39, 91, 130; 379/55.1, 56.1, 56.3

[56] References Cited

U.S. PATENT DOCUMENTS

| | | | |
|---|---|---|---|
| 4,658,096 | 4/1987 | West, Jr. et al. | 455/74.1 |
| 4,680,787 | 7/1987 | Marry | 455/557 |
| 4,744,101 | 5/1988 | Saegusa | 455/464 |
| 4,745,632 | 5/1988 | Duffy | 455/550 |
| 4,752,949 | 6/1988 | Steinbeck et al. | 455/74.1 |
| 4,906,989 | 3/1990 | Kasugai | 340/825.44 |
| 4,959,851 | 9/1990 | Tobolski, Jr. et al. | 455/74.1 |
| 4,972,457 | 11/1990 | O'Sullivan | 455/556 |
| 4,991,197 | 2/1991 | Morris | 455/557 |
| 5,241,593 | 8/1993 | Wagner | 379/438 |
| 5,526,403 | 6/1996 | Tam | 455/426 |
| 5,533,097 | 7/1996 | Crane et al. | 455/522 |

FOREIGN PATENT DOCUMENTS

5-37618  2/1993  Japan .

*Primary Examiner*—Andrew M. Dolinar
*Attorney, Agent, or Firm*—John J. Oskorep; Michael C. Soldner

[57] ABSTRACT

A mobile station (101) and a base station (103) coupled to a land line network (200) communicate over a radio frequency (RF) communication link (202). The mobile station (101) includes a jack (104) for optionally attaching a cord (172) between the mobile station (101) and the base station (103) for establishing a wireline communication link therebetween. When the wireline communication link is established, the RF communication link (202) is terminated. During a telephone call when the RF communication link (202) is established, the cord (172) may be attached to establish the wireline communication link without interrupting the telephone call.

22 Claims, 4 Drawing Sheets

METHOD OF AND APPARATUS FOR COMMUNICATING INFORMATION SIGNALS

FIELD OF THE INVENTION

The present invention relates generally to communication systems, and more particularly to cordless telephone communication systems.

BACKGROUND OF THE INVENTION

Cordless communication systems are known. Such systems provide convenient communications between a pair of electronic devices without the use of a cord attached therebetween. Typically, at least one of the electronic devices is portable and thus requires a battery for electrical operation. Unfortunately, when the battery is low or fully drained, the electronic device may not be usable unless a fully-charged backup battery is readily available.

Cordless communication systems typically provide communications over a radio frequency (RF) communication link. Although such systems are thoughtfully designed and provide reliable communications, RF interference may sometimes hinder communication between the electronic devices. In addition, if a cordless communication system is not designed as a "secure" system, communication over the RF link may be susceptible to eavesdropping. Even when provided with an electronic device having secure communications, a user may nonetheless feel uneasy about communicating sensitive information over the RF link.

Accordingly, there is a need for a communication system which overcomes the deficiencies described above.

DETAILED DESCRIPTION OF THE PREFERRED EMBODIMENTS

According to the present invention, a mobile station and a base station coupled to a land line network communicate over a radio frequency (RF) communication link. The mobile station includes a jack for optionally attaching a cord between the mobile station and the base station to establish a wireline communication link therebetween. When the wireline communication link is established, the RF communication link is terminated and electrical circuitry in the mobile station is powered down. During communications where the RF communication link is established, the cord may be attached to establish the wireline communication link without interrupting the communications.

Figure 1:
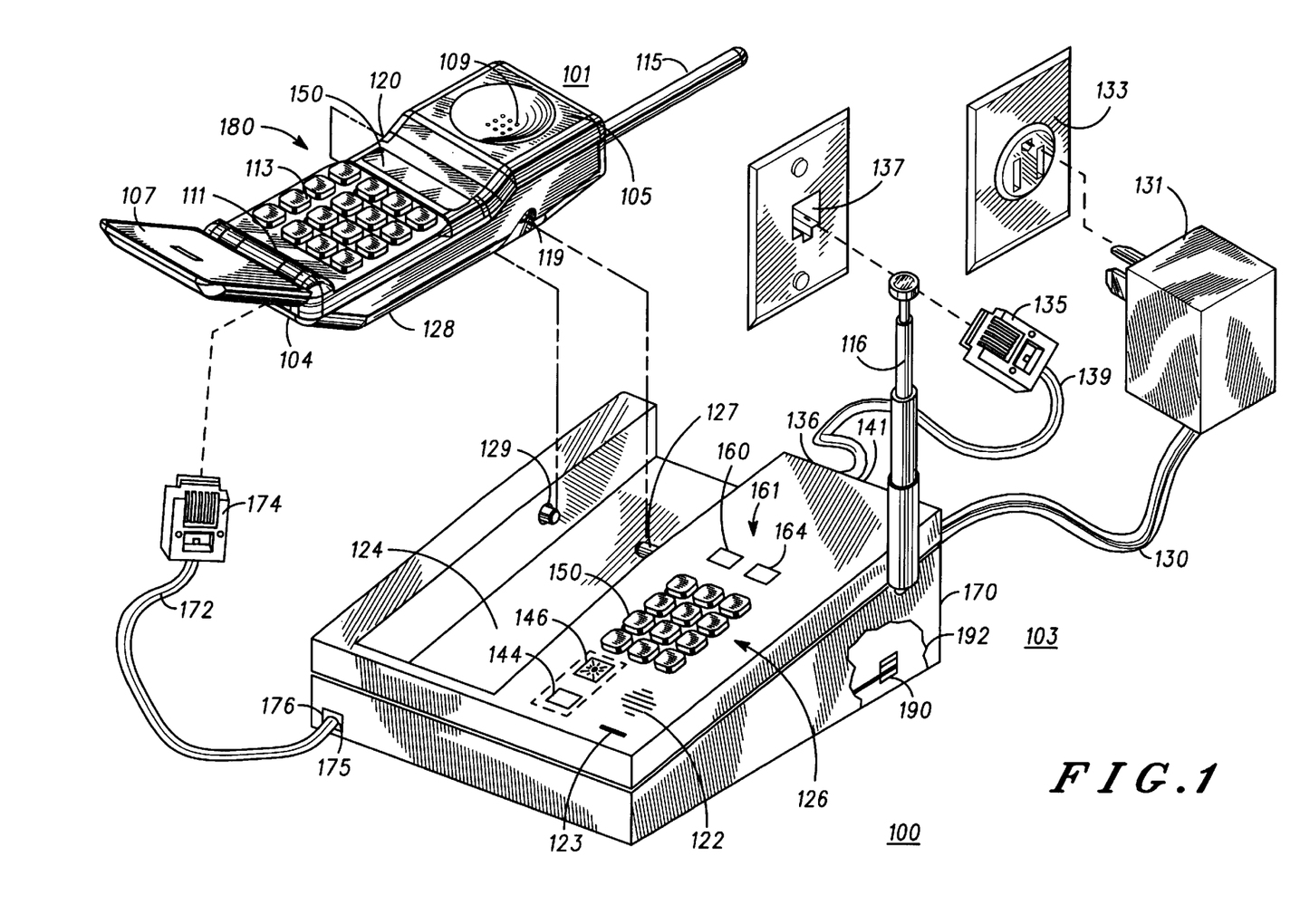
FIG. 1 is an illustration of a communication system including a base station and a mobile station.

FIG. 1 is an illustration showing a communication system 100 in accordance with the present invention. In the embodiment shown, communication system 100 may be commonly referred to as a telephone communication system or a cordless telephone system.

Communication system 100 comprises a mobile station 101 and a base station 103. Mobile station 101 includes a housing 105, a cover element 107, a user interface 180, an antenna 115, a battery 128, electrical contacts 119 and 120, and a jack 104. Base station 103 includes a housing 170, a user interface 126, a jack 175, a telephone jack 141 (not visible), a cradle 124, electrical contacts 127 and 129, an antenna 116, a power cord 130, and a transformer plug 131. Mobile station 101 and base station 103 each include electrical circuitry disposed within housings 105 and 170.

In mobile station 101, user interface 180 comprises a keypad 113, a display 150, a speaker 109, and a microphone 111. Keypad 113 includes conventional telephone keys, that is, dual-tone multiple frequency (DTMF) signaling keys, and additional function keys such as "channel select" and "volume" keys. Display 150 provides illuminated messages including confirmation of the conventional telephone key presses. The illustration of FIG. 1 shows cover element 107 in an "open" position such that the user may listen to audio from speaker 109 and speak into microphone 111. Typically, when a telephone line of communication system 100 is "on-hook", the action of opening cover element 107 places the telephone line "off-hook", as does the action of pressing one of the additional function keys of keypad 113. To place the telephone line back on-hook, cover element 107 may be closed or, again, one of the additional function keys may be depressed.

Since mobile station 101 is a portable electronic device, it requires battery 128 for powering the electrical circuitry disposed within housing 105. Battery 128 is typically rechargeable, and can be recharged when mobile station 101 is placed within cradle 124 of base station 103. When appropriately positioned therein, electrical contacts 127 and 129 make contact with electrical contacts 119 and 120, respectively, so that base station 103 can charge battery 128 when necessary.

User interface 126 of base station 103 includes a keypad 150, a display 146, a speaker 122, a microphone 123, and additional function keys 161. Keypad 150 includes DTMF signaling keys for placing telephone calls at base station 103. Additional function keys 161 include a first function key 160, a second function key 164, and a third function key 144. One of additional function keys 161, preferably third function key 144, is used to place a telephone line of base station 103 off-hook and on-hook for initiating and ending telephone calls. When the telephone line is taken off-hook at base station 103, base station 103 is placed into a "hands-free" or speakerphone mode where speaker 122 and microphone 123 are used.

During typical usage, mobile station 101 and base station 103 communicate over an RF communication link for providing the user with cordless telephone communications. Antennas 115 and 116 receive and transmit RF signals for transferring voice and control signals to and from mobile station 101 and base station 103.

FIG. 1 additionally shows a telephone cord 139, a telephone jack 137, and an alternating current (AC) source outlet 133. Telephone jack 137 has electrical contacts which are coupled to a land line network (not shown in FIG. 1). Telephone cord 139 has a telephone plug 135 on one end and a telephone plug 136 (not visible) on the other end. Telephone jack 137 and telephone plugs 135 and 136 are constructed according to RJ-11 or other appropriate standards. To electrically couple the electrical circuitry of base station 103 to the land line network, telephone plug 135 is insertably attached within telephone jack 137 and telephone plug 136 is insertably attached within telephone jack 141. In order for base station 103 to operate, transformer plug 131 is inserted within AC source outlet 133 so that the electrical circuitry of base station 103 is electrically powered.

Communication system 100 further includes a cord 172. Cord 172 includes a plug 174 on one end thereof and a plug 176 on the other end thereof. A wireline communication link may be established between mobile station 101 and base station 103 by insertably attaching plug 174 within jack 104 and insertably attaching plug 176 within jack 175. Since mobile station 101 and base station 103 may communicate over an RF communication link, cord 172 is provided as an option for communication system 100. Preferably, cord 172 is a telephone cord, plugs 174 and 176 are telephone plugs, and jacks 104 and 175 are telephone jacks, all of which are manufactured in accordance with RJ-11 or other appropriate standards. Of course, other suitable electrical and mechanical connections, or wireline interfaces, may be substituted for jacks 104 and 175, plugs 174 and 176, and cord 172.

Communication system 100 operates in a first operating mode and a second operating mode. In the first operating mode, mobile station 101 and base station 103 communicate voice and control information over the RF communication link. Here, since mobile station 101 is not physically connected to base station 103, a user is provided with convenience that a cordless system typically provides. In the second operating mode, mobile station 101 and base station 103 communicate the information over the wireline communication link. Here, there is a physical and electrical connection between mobile station 101 and base station 103. During this mode, at least a portion of the electrical circuitry of mobile station 101 is powered down. Transmission and reception of RF signals may be fully or partially terminated. Thus, a user of communication system 100 is provided with a corded option that may be useful or preferred when battery 128 is low, when communication is hindered by unexpected RF interference, or when a user needs assurance of improved privacy during communications.

Figure 2:
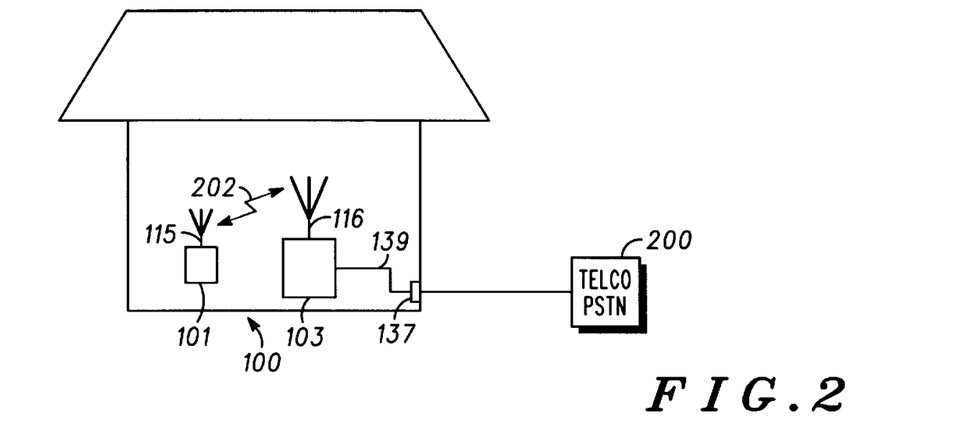
FIG. 2 is a block diagram of the communication system, where a radio frequency (RF) communication link is established between the base station and the mobile station.

FIG. 2 is a block diagram showing communication system 100 in the first operating mode, where an RF communication link 202 is established between mobile station 101 and base station 103. FIG. 2 additionally shows base station 103 connected to a land line network 200.

Figure 3:
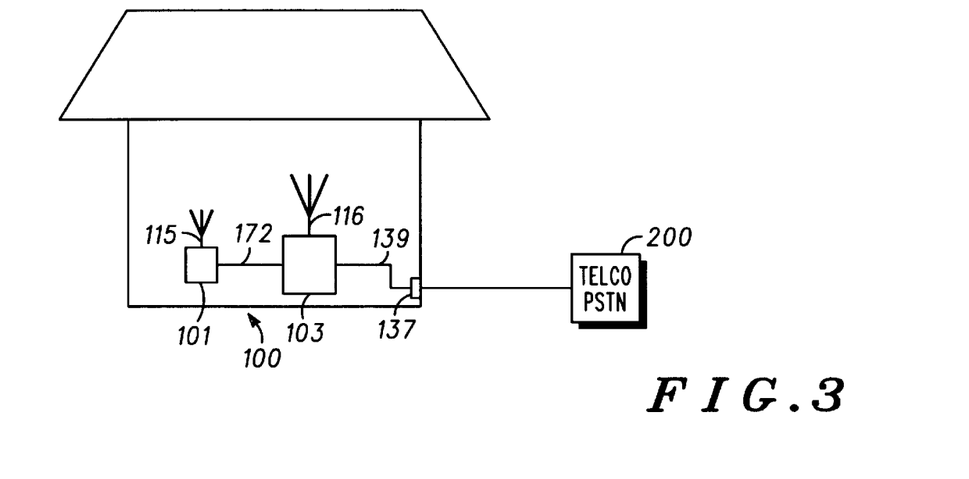
FIG. 3 is a block diagram of the communication system, where a wireline communication link is established between the base station and the mobile station.

FIG. 3 is a block diagram showing communication system 100 in the second operating mode, where the wireline communication link is established using cord 172. Upon the attachment of cord 172, RF communication link 202 (FIG. 2) is fully (or partially) terminated.

Figure 4:
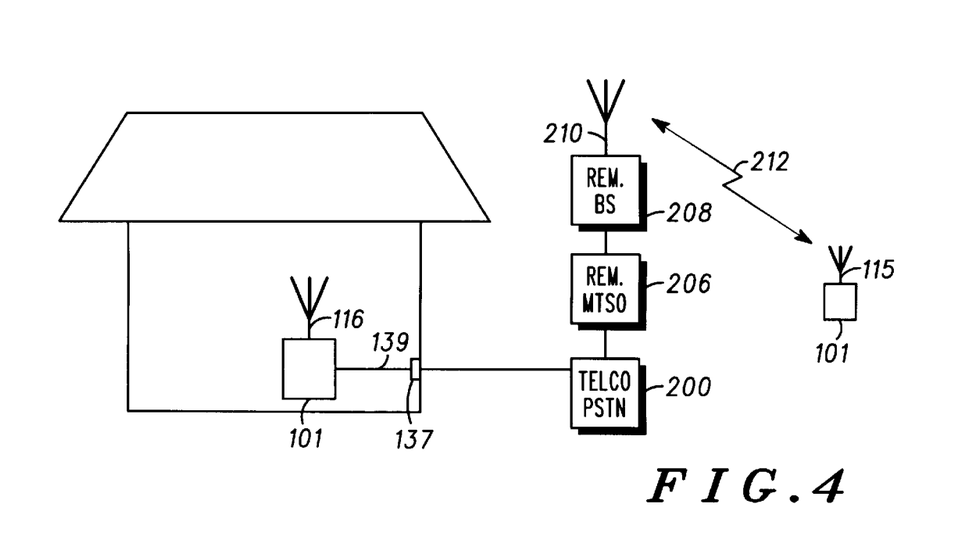
FIG. 4 is a block diagram of the communication system where the mobile station is communicating with a remote base station.

FIG. 4 is a block diagram showing that mobile station 101 may communicate with a remote base station 208 over a remote communication link 212. Remote base station 208 typically serves several mobile stations within a designated coverage area, using several wireless channels. Such wireless channels could be, for example, exclusively assigned frequencies or exclusively assigned time slots of a time division multiple access (TDMA) system.

Remote base station 208 includes an antenna 210 for transmitting and receiving RF signals to and from mobile station 101. Remote base station 208 is coupled to a remote switching network 206 which is coupled to land line network 200. When mobile station 101 is within a coverage area of base station 103, it communicates with base station 103 for telephone communications (FIG. 2). However, when mobile station 101 is out of range of base station 103 and brought within a coverage area of remote base station 208, it communicates with remote base station 208 for telephone communications (FIG. 4).

As will be discussed further below, mobile station 101 can be connected to remote base station 208 by a cord. In this embodiment, remote base station 208 is preferably a base station of a personal communications system (PCS).

Figure 5:
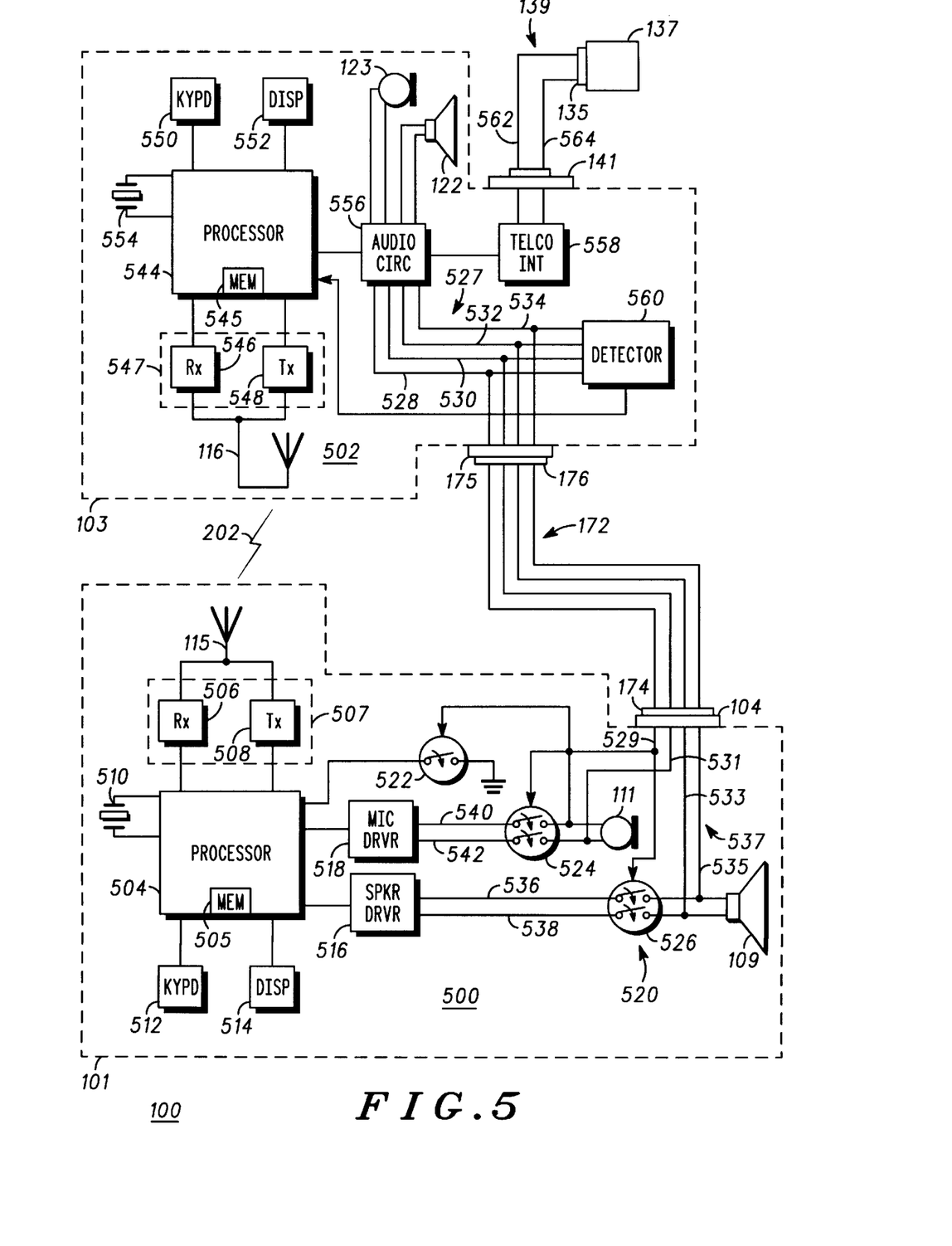
FIG. 5 is a schematic block diagram of electronic circuitry of the mobile station and the base station.

FIG. 5 shows a schematic block diagram of communication system 100, including electrical circuitry 500 of mobile station 101 and electrical circuitry 502 of base station 103. In the mobile station 101, electrical circuitry 500 is battery-operated circuitry and comprises a processor 504, an oscillator 510, a transceiver 507 (including a receiver 506 and a transmitter 508), a keypad circuit 512, a display circuit 514, a speaker driver 516, a microphone driver 518, switching circuitry 520, and a plurality of conductors 537. Processor 504 includes a memory 505 that has an embedded software program and data stored therein. The embedded software program controls and operates electrical circuitry 500.

Jack 104 (FIG. 1) is an interface to electrical circuitry 500 of mobile station 101 and includes electrical contacts, each of which are coupled to one of the plurality of conductors 537. The plurality of conductors 537 includes lines 529, 531, 533, and 535. Lines 529 and 531 ("microphone lines") electrically couple two of the electrical contacts of jack 104 to microphone 111. Lines 533 and 535 ("speaker lines") electrically couple two of the electrical contacts of jack 104 to speaker 109. Line 529 ("detection line") electrically couples one of the electrical contacts of jack 104 to switching circuitry 520.

In the base station 103, electrical circuitry 502 comprises a processor 544, a transceiver 547 (including a receiver 546 and a transmitter 548), a keypad circuit 550, a display circuit 552, an oscillator 554, an audio circuit 556, telephone interface circuitry 558, a detector 560, and a plurality of conductors 527. Like processor 504, processor 544 includes a memory 545 having an embedded software program and data stored therein. The embedded software program controls and operates electrical circuitry 502.

Tip and ring lines 562 and 564 from land line network 200 (FIG. 2) are received through telephone cord 139 and are coupled to telephone interface circuitry 558. Telephone interface circuitry 558 is coupled to audio circuit 556, which is coupled to speaker 122, microphone 123, processor 544, detector 560, and electrical contacts of jack 175. Each of the electrical contacts of jack 175 are coupled to one of the plurality of conductors 527. The plurality of conductors 527 includes lines 528, 530, 532, and 534. The plurality of conductors 527 are coupled to audio circuit 556 and detector 560.

In the first operating mode, which may be the most typical operating mode of communication system 100, most of electrical circuitry 502 of base station 103 is enabled and operating. For example, processor 544 reads inputs from keypad circuit 550, provides signals to display circuit 552 for visual messages, and controls and processes signals to and from audio circuit 556.

Processor 544 also controls and processes signals to and from transmitter 548 and receiver 546. Receiver 546 receives modulated RF signals from mobile station 101 through antenna 116. The modulated RF signals have information signals modulated thereon, which are voice and control signals generated from mobile station 101. Receiver 546 demodulates the modulated RF signals to recover the information signals. The information signals recovered are in digital and possibly encrypted form. Processor 544 processes the information signals and performs any necessary decryption. Some of the information signals are used for control purposes, and some of the information signals are converted into analog form and routed to telephone interface circuitry 558 through audio circuit 556. The outgoing land line signals from telephone interface circuitry 558 are sent over tip and ring lines 562 and 564.

Incoming land line signals are received at telephone interface circuitry 558 from tip and ring lines 562 and 564. Audio circuit 556 receives and processes these signals and feeds them to processor 544 for further processing. Processor 544 digitizes these signals and encrypts them if necessary. Transmitter 548 generates RF signals, modulates the RF signals with the processed information signals, and transmits the modulated RF signals to mobile station 101 through antenna 116.

When base station 103 is in the speakerphone mode and mobile station 101 is not in use, however, audio circuit 556 may simply send and receive the information signals to and from speaker 122 and microphone 123, respectively, without requiring the full use of receiver 546 and transmitter 548. Here, audio circuit 556 processes, amplifies, and routes the information signals from telephone interface circuitry 558 to speaker 122. Audio circuit 556 also processes and routes information signals from microphone 123 to telephone interface circuitry 558.

Like electrical circuitry 502 of base station 103, most of electrical circuitry 500 of mobile station 101 is enabled and operating during the first operating mode. For example, processor 504 reads inputs from keypad circuit 512 and provides signals to display circuit 514. All of switches 522, 524, and 526 are in a closed position so that processor 504 is indeed active, microphone driver 518 is coupled to microphone 111, and speaker driver 516 is coupled to speaker 109.

Processor 504 processes, digitizes, and encrypts (if necessary) information signals that are obtained from a number of sources within mobile station 101. These sources include microphone 111 (which generates information signals from an audio source), keypad circuit 512 (which generates information signals from user actuations of keys of keypad 113), and processor 504 itself (e.g., which generates control data). These information signals are routed to transmitter 508. Transmitter 508 generates RF signals, modulates the RF signals with the information signals to generate modulated RF signals, and transmits the modulated RF signals to base station 103 through antenna 115.

Receiver 506 receives modulated RF signals (having information signals modulated thereon) from base station 103 through antenna 115. Receiver 506 demodulates the modulated RF signals to recover the information signals. Processor 504 receives the information signals from receiver 506 and processes them. Some of the information signals are used to control mobile station 101, and some of them are converted into analog form and routed to speaker driver 516. Audible signals are thus heard through speaker 109.

A transition from the first operating mode to the second operating mode occurs automatically when cord 172 is attached between mobile station 101 and base station 103. Cord 172 has electrical conductors which, when attached between mobile station 101 and base station 103, couple lines 528, 530, 532, and 534 to lines 529, 531, 533, and 535, respectively. Therefore, when plug 174 is inserted into jack 104, speaker 109 and microphone 111 are electrically coupled to telephone interface circuitry 558, indirectly through audio circuit 556.

A bias voltage appears at line 529 which causes each switch of switching circuitry 520 to open. The switching action causes microphone driver 518 to decouple from microphone 111 and speaker driver 516 to decouple from speaker 109. Therefore, speaker 109 and microphone 111 are driven and operated by electrical circuitry 502 of base station 103, and not by electrical circuitry 500 of mobile station 101. The information signals that were once communicated over a wireless communication link through the generation and modulation of RF signals are now communicated directly (i.e., without the use of modulated RF signals) over the wireline communication link created through the attachment of cord 172.

The switching action also powers down processor 504 (including oscillator 510) which, in turn, shuts down receiver 506, transmitter 508, keypad circuit 512, and display circuit 514. All of the battery-operated circuitry of mobile station 101 is powered down, and therefore no current from battery 128 is required for operation. Alternatively, the detection of cord 172 causes processor 504 to at least shut down transmitter 508 or portions thereof, since RF transmission is no longer necessary and a substantial amount of current is typically drawn therefrom. Indeed, transmitter 508 or any other electronic circuit within mobile station 101 may be powered down directly (through switches) or indirectly (through processor 544) when cord 172 is attached. Battery 128 may itself be switchably disconnected from all or most of electrical circuitry 500.

In base station 103, detector 560 detects a load from mobile station 101 when cord 172 is attached therebetween. Upon this detection, detector 560 provides a signal to processor 544 which, in turn, powers down receiver 546 and transmitter 548. If necessary, processor 544 controls audio circuit 556 to set up a corded telephone connection between telephone interface circuitry 558, audio circuit 556, speaker 109, and microphone 111.

During the second operating mode, then, at least some of electrical circuitry 500 of mobile station 101 and at least some of electrical circuitry 502 of base station 103 is powered down. In the embodiment described above, most, if not all, of electrical circuitry 500 is powered down so that little or no power is needed when cord 172 is attached. Therefore, a user can still make use of mobile station 101 when battery 128 is low and a fully-charged backup battery is not available, or when wireless communications is unnecessary and the user wishes merely to conserve power in battery 128. The corded option is deemed particularly valuable where user interface 126 is excluded from the design of base station 103 and the user has no other available communication means when battery 128 is low or dead.

Alternatively, and perhaps preferably, at least portions of processor 504, keypad circuit 512, and display circuit 514 remain powered on and active while any communication circuitry (here, receiver 506 and transmitter 508) is completely shut down. Since processor 504 no longer needs to continually process data and control signals relating to receiver 506 and transmitter 508, receiver 506 and transmitter 508 can be completely shut down to maximize power conservation. Alternatively, the communication circuitry may maintain a low duty cycle (and low power) RF link to maintain minimum control between mobile station 101 and base station 103 while voice signals are communicated via cord 172. This partial RF link may maintain, for example, RF synchronization and user interface control.

Relatively simple and low power circuits, such as keypad circuit 512, may be processed. If memory 505 is utilized for phone features such as memory dialing, turbo dialing, etc., these features may remain operational, using little or no power from battery 128. A means should be provided for communicating such data to base station 103, such as a partial RF link, as described above, or a separate communication line. (Such a separate communication line is not shown in FIG. 5, but is described below in relation to FIG. 6.)

Alternatively, some of the plurality of conductors 537 may be multiplexed for communications and/or control. For example, coupled lines 528 and 529 may be multiplexed such that an on-hook and off-hook signal from mobile station 101 can be sent to base station 103 when cover element 107 is closed and opened, respectively, or when one of the additional function keys of keypad 113 is depressed.

When cord 172 is detached from mobile station 101 and base station 103, a transition from the second operating mode to the first operating mode occurs. In mobile station 101, the bias voltage on line 529 is lost and switch 522 thus reactivates processor 504 and other circuitry. In base station 103, detector 560 detects the loss of the load and signals processor 544. Thereafter, mobile station 101 and base station 103 reestablish the RF communication link with receivers 506 and 546 and transmitters 508 and 548.

Thus, communication system 100 can provide an interrupt-free transformation between a cordless and a corded mode of operation during a telephone call. When cord 172 is attached during a telephone call, a wireline communication link is established at or near the same time RF communication link 202 is terminated. During such transition, electrical circuitry 502 maintains (i.e., does not "drop") the connection to the call.

Although mobile station 101 and base station 103 are each described detecting a particular "connection signal" (a bias voltage at mobile station 101 and a load change at base station 103) for changes in their operation, other connection signals for such detection will suffice. For example, a connection signal may be detected in base station 103 and transmitted therefrom to mobile station 101 over the RF communication link. On the other hand, a "disconnection signal", described herein as a loss of the bias voltage at mobile station 101 and a loss of the load at base station 103, may be a loss of the connection signal or a signal that is separate and distinct from the connection signal.

Figure 6:
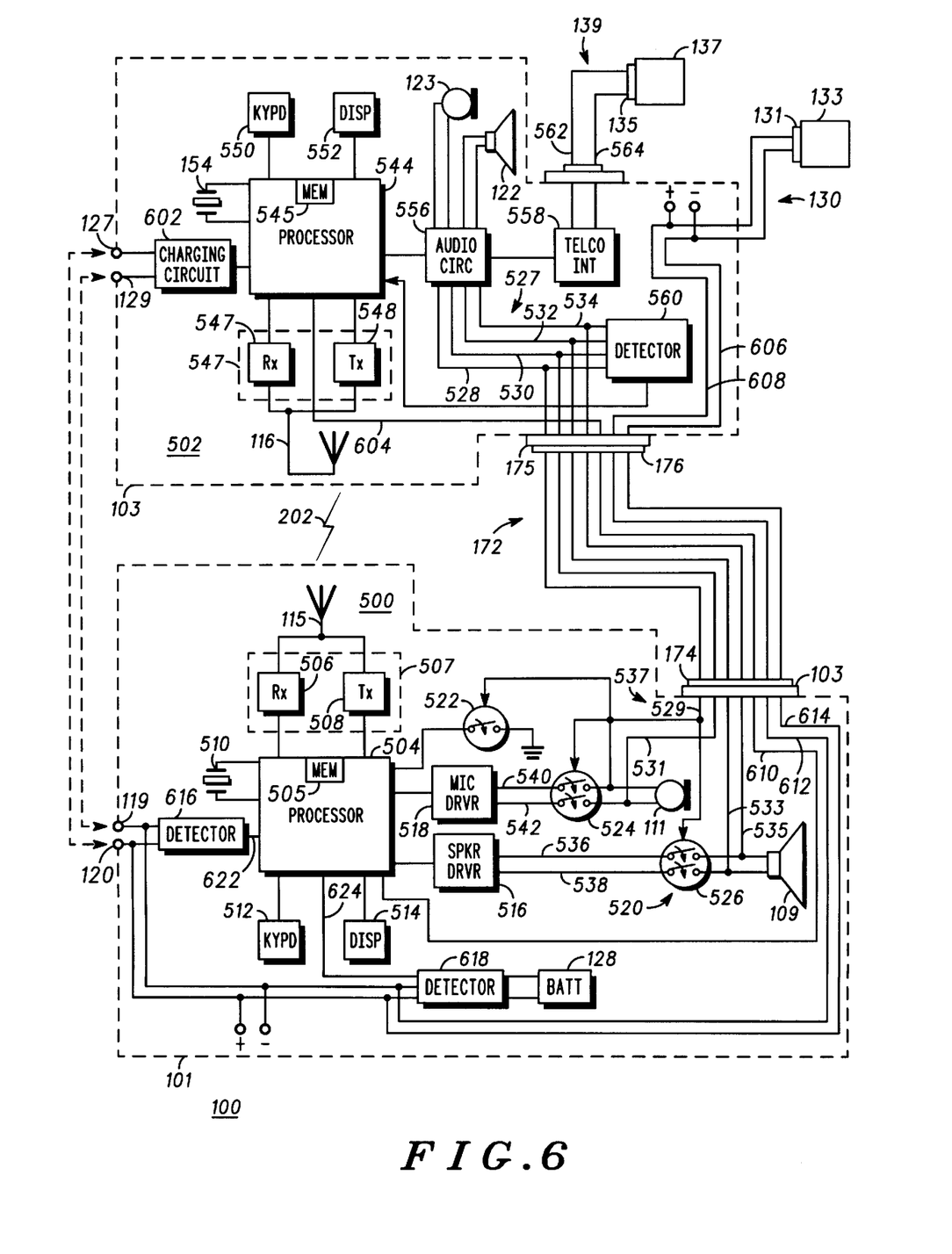
FIG. 6 is a schematic block diagram of an alternate embodiment of the electronic circuitry of the mobile station and the base station.

FIG. 6 shows a schematic block diagram of an alternate embodiment of communication system 100. Here, mobile station 101 and base station 103 include electronic circuitry and conductors in addition to those shown in FIG. 5. Base station 103 includes a charging circuitry 602 coupled to and controlled by processor 544, and coupled to electrical contacts 127 and 129. Base station 103 also includes additional electrical conductors at jack 175, namely, a line 604, a line 606, and a line 608. In mobile station 101, processor 504 additionally includes an input 622 and an input/output 624. Mobile station includes a detector 616 coupled to input 622 and a detector 618 coupled to input/output 624. Mobile station 101 also includes additional electrical conductors at jack 104, namely, a line 610, a line 612, and a line 614.

Cord 172 of FIG. 6 has additional electrical conductors than shown in the embodiment in FIG. 5. When cord 172 is attached between mobile station 101 and base station 103, lines 528, 530, 532, 534, 604, 606, and 608 are electrical coupled to lines 529, 531, 533, 535, 610, 612, and 614, respectively. When coupled, lines 604 and 610 communicate data and/or control signals between mobile station 101 and base station 103. In addition, lines 606 and 608 supply power to mobile station 101 via lines 612 and 614. Lines 606 and 608 may also supply power for recharging battery 128.

Again, as previously described in the embodiment of FIG. 5, mobile station 101 and base station 103 communicate via cord 172 when attached, and via RF signals otherwise. When cord 172 is attached, portions of electrical circuitry 500 and 502 are shut down. For example, receiver 506 and transmitter 508 may be turned off and processor 504 may be placed into a low power consumption mode. If power is supplied from lines 612 and 614, it may not be necessary, for example, to place processor 504 in a low power consumption mode. In either case, oscillator 510 remains active so that processor 504 can still process certain tasks.

Such tasks may include processing inputs and outputs of user interface 180 (FIG. 1). That is, processor 504 may read and process inputs from keypad circuit 512 and provide the appropriate data and control signals to display circuit 514. When one of DTMF signaling keys of keypad 113 is actuated, for example, processor 504 detects and processes a signal from keypad circuit 512 and sends a corresponding data signal to base station 103 via line 610. In base station 103, processor 544 receives the corresponding data signal through line 604 and processes it accordingly for transmission over the land line network through telephone interface circuitry 558. Similarly, when display circuit 514 needs updating, processor 544 sends the appropriate data and control signals via line 604. In mobile station 101, processor 504 receives the appropriate data and control signals through line 610 and processes the signals accordingly to update display circuit 514.

Of course, although only one communication line between mobile station 101 and base station 103 is shown and described (that is, line 610 coupled to line 604), more than one line may be provided. For example, communication system 100 may provide separate data lines for data reception and transmission.

According to conventional operating techniques, when mobile station 101 is appropriately placed within cradle 124 (FIG. 1), charging circuitry 602 is activated for recharging battery 128. When battery 128 is recharging, detector 618 and processor 504 must monitor battery 128 to detect when it is fully charged. In response to such detection, detector 618 and processor 504 appropriately terminate the charge to battery 128. As described in the embodiment of FIG. 5, however, processor 504 may be powered down when cord 172 is attached. Here, processor 504 is inactive and thus not ordinarily capable of processing (terminating the charge to battery 128) when necessary.

This problem may be solved using detector 616. Detector 616 is capable of detecting when mobile station 101 is placed within cradle 124. In response to such detection, detector 616 generates a signal at input 622 which triggers an interrupt to processor 504. Thereafter, processor 504 remains active for handling tasks relating to recharging battery 128. During this time, processor 504 and other necessary circuitry may be powered by base station 103 through electrical contacts 127 and 129. Thus, when cord 172 is attached between mobile station 101 and base station 103, perhaps since battery 128 is low, battery 128 can still be recharged by placing the mobile station 101 within cradle 124. Of course, this method is unnecessary if lines 612 and 614 are provided for powering mobile station 101 and recharging battery 128.

As described in relation to FIG. 4, mobile station 101 may also be electrically connected to remote base station 208, which is preferably a remote base station of a PCS system. In a PCS system, each base station provides a smaller coverage area than traditional cellular base stations and, therefore, many more base stations per unit area are utilized. Such base stations are more easily accessible and conceivably may be located on the top of telephone poles, inside shopping malls and office buildings, etc. Thus, it may be more practical to include wireline interfaces to such base stations. Preferably, the wireline interfaces are standardized to maximize compatibility of mobile stations produced by different manufacturers.

Such a system operates similarly to communication system 100 described above, but includes additional operability. When a mobile station is electrically connected to a remote base station and a user of the mobile station places a call, user information in the mobile station may be used for billing the land line-based call or for other purposes. The base station may signal for or determine a rate of cost lower than that of a typical wireless connection rate. If a call is established over a wireless channel of the base station and an electrical connection is subsequently made, the base station may respond by making the wireless channel available to other mobile stations, signaling for or determining a lower rate of cost, or both. When a loss of the electrical connection occurs during a call, the base station may respond by terminating the call in progress, accessing an open wireless channel for the mobile station, signaling for or determining a higher rate of cost to the user, or both accessing the open wireless channel and signaling for or determining the higher rate of cost. If an open wireless channel is not available upon disconnection, the user may be made aware of this fact by a signal from the mobile or base station. In this situation, the base station may retain the land line connection for a predetermined time period until the user reestablishes the wireline connection.

In the system described above, the number of wireline interfaces provided at any given base station may vary depending on expected use. The wireless capacity of the base station need not be compromised from usage of the added wireline interfaces since the land line availability to the base station may be increased accordingly.

Such a system provides many benefits for both customers and service providers. First, the system provides, at a minimum, an alternative way for users to pay for remote land line-based telephone calls. Second, the system can provide users with remote telephone service at a lower cost. Third, the system allows users to use their own preferred communication devices which may include their own personal preprogrammed telephone numbers, preferred user interfaces, etc. Fourth, the system provides a backup for users who have communication devices with low batteries or other complications. Fifth, wireline interfaces at such base stations can be manufactured at a low cost compared to the cost of manufacturing traditional remote land line-based telephones.

In any or all of the embodiments described above, cord 172 is preferably included as a part of base station 103 and is retractable therefrom. Referring back to FIG. 1, cord 172 is typically hidden within housing 170 on a retracting mechanism 190 (shown through a cutaway 192 of housing 170) until it is pulled therefrom by a user. Retracting mechanism 190 preferably includes a retractable spring coil (not shown). When the user no longer wishes to use cord 172, plug 174 is unplugged from jack 104 and cord 172 retracts back into housing 170 by retracting mechanism 190. Retracting mechanism 190 is activated by some means accessible to the user. For example, it may be activated by an actuation of one of additional function keys 161, or by a quick outward tug of cord 172.

Of course, communication system 100 could comprise any two (or more) electronic devices that communicate electronic signals therebetween. For example, an electronic device that is a voice microphone may communicate with an associated electronic device that is a receiver. Here, the voice microphone includes a transmitter for transmitting voice signals to the receiver over an RF communication link. When the voice microphone is attached to the receiver via a microphone cord, a wireline communication link is established for sending the voice signals and the RF communication link may be terminated.

While particular embodiments of the present invention have been shown and described, modifications and substitutions may be made. For example, the RF link herein described may be equally substituted with any wireless communication link, such as a magnetic induction link, an optical link, or an infrared link. The cord described herein may be substituted with other equivalent means of coupling, such as coupling provided by mating connectors. In addition, speaker 109 could be any such information processing circuit and microphone 111 could be any such information generating circuit. It is therefore intended in the appended claims to cover all such changes and modifications which fall within the true spirit and scope of the invention.

What is claimed is:

1. A method of communicating information signals in an electronic device, the electronic device including a power source, electrical circuitry, a speaker, a microphone, and a wireline interface having electrical contacts, the method comprising the steps of:

generating information signals;

generating radio frequency (RF) signals;

modulating the RF signals with the information signals, thereby generating modulated RF signals;

transmitting the modulated RF signals;

providing the information signals at the electrical contacts of the wireline interface;

detecting a connection signal, the connection signal indicating that an electrical connection exists between the electronic device and an associated electronic device for communicating the information signals;

terminating transmission of the modulated RF signals in response to the connection signal; and decoupling the speaker and the microphone from the power source in response to the connection signal.

2. The method according to claim 1 further comprising the step of powering down at least a portion of the electrical circuitry in response to the connection signal.

3. The method according to claim 2 further comprising the steps of:

detecting a disconnection signal;

recoupling the speaker and microphone to the power source; and reestablishing the transmission of the modulated RF signals in response to the disconnection signal.

4. The method according to claim 3 further comprising the steps of:

repowering the at least a portion of the electrical circuitry in response to the disconnection signal.

5. The method according to claim 1 further comprising the steps of:

detecting a disconnection signal;

recoupling the speaker and microphone to the power source; and reestablishing the transmission of the modulated RF signals in response to the disconnection signal.

6. The method according to claim 1 further comprising the step of maintaining the communication of information signals with the associated electronic device via the electrical connection during the step of terminating.

7. An electronic device, comprising:

an information generating circuit to generate information signals;

a transmitter coupled to said information generating circuit, said transmitter to wirelessly transmit electrical signals having the information signals modulated thereon;

a wireline interface including electrical contacts coupled to said information generating circuit, said wireline interface to provide the information signals at said electrical contacts;

switching circuitry coupled to at least one of the electrical contacts of said wireline interface, said switching circuitry to detect a connection signal at the electrical contacts and, in response thereto, terminate transmission of the electrical signals having the information signals modulated thereon; and a power source to power electrical circuitry of the device, wherein said switching circuitry decouples a speaker and a microphone from said power source in response to the connection signal.

8. The electronic device in accordance with claim 7 wherein said switching circuitry powers down said transmitter in response to the connection signal.

9. The electronic device in accordance with claim 7 wherein said switching circuitry decouples, in response to the connection signal, the information signals of said information generating circuit from said transmitter.

10. The electronic device in accordance with claim 7 wherein said information generating circuit comprises a microphone.

11. The electronic device in accordance with claim 7 further including:

a housing;

a cord including the electrical contacts; and a retracting mechanism disposed within said housing, said retracting mechanism having the cord attached thereto for controlling insertion and removal of the cord to and from said housing.

12. An electronic device, comprising:

an information processing circuit to process information signals;

a receiver coupled to said information processing circuit, said receiver to wirelessly receive and demodulate electrical signals having the information signals modulated thereon;

a wireline interface including electrical contacts coupled to said information processing circuit, said wireline interface to optionally receive the information signals at the electrical contacts through an electrical connection with an associated electronic device;

switching circuitry coupled to at least one of the electrical contacts of said wireline interface, said switching circuitry to detect a connection signal at the electrical contacts and, in response thereto, terminate wireless reception of the electrical signals having the information signals modulated thereon; and a power source to power electrical circuitry of the device, wherein said switching circuitry decouples the information processing circuit from said power source in response to the connection signal.

13. The electronic device in accordance with claim 12 wherein said switching circuitry powers down said receiver in response to the connection signal.

14. A portable electronic device, comprising:

an information generating circuit to generate first information signals;

a transmitter coupled to said information generating circuit, said transmitter to wirelessly transmit first electrical signals having the first information signals modulated thereon;

a receiver to wirelessly receive and demodulate second electrical signals having second information signals modulated thereon;

an information processing circuit coupled to said receiver, said information processing circuit to receive and process the second information signals;

a wireline interface including electrical contacts coupled to said information generating circuit and said information processing circuit, said wireline interface to provide the first information signals and to accept the second information signals at the electrical contacts;

switching circuitry coupled to at least one of the electrical contacts of said wireline interface, said switching circuitry to detect a connection signal at the electrical contacts and, in response thereto, terminate transmission of the first electrical signals having the first information signals modulated thereon and to terminate reception of the second electrical signals having the second information signals modulated thereon and a power source to power electrical circuit of the device, wherein said switching circuitry decouples the information generating circuit and the information processing circuit from said power source in response to the connection signal.

15. The portable electronic device according to claim 14 wherein said information generating circuit comprises a microphone and said information processing circuit comprises a speaker.

16. A method of providing communications in a base station, the method comprising the steps of:

assigning a wireless channel to a mobile station for communications;

detecting that a wireline connection exists between the mobile station and the base station, wherein the wireline connection electrically couples telephone interface circuitry in the base station with a speaker and a microphone in the mobile station;

terminating assignment of the wireless channel to the mobile station in response to the step of detecting; and decoupling the speaker and the microphone from a power source in the mobile station in response to the step of detecting.

17. The method according to claim 16 further comprising the step of maintaining the communication of information signals with the mobile station via the wireline connection during the step of terminating.

18. A telephone communication system, comprising:

a base station including:

telephone interface circuitry, said telephone interface circuitry for electrically coupling to a land line network, said telephone interface circuitry capable of generating first information signals from incoming land line signals and capable of generating outgoing land line signals from second information signals;

a base station transceiver, said base station transceiver to send the first information signals and to receive the second information signals over a radio frequency (RF) communication link;

a mobile station including:

battery-operated circuitry including:

a mobile station transceiver, said mobile station transceiver to send the second information signals and to receive the first information signals over the RF communication link;

a speaker to produce audible signals in response to the first information signals;

a microphone to generate the second information signals from an audio source;

a wireline interface, said wireline interface including electrical contacts coupled to said speaker and said microphone, said wireline interface constructed to receive a plug of a cord for establishing a wireline communication link between said mobile station and said base station where said speaker and said microphone are electrically coupled to said telephone interface circuitry;

switching circuitry coupled to at least one of the electrical contacts of said wireline interface and coupled to said batty-operated circuitry and a battery power source to power the battery-operated circuitry, wherein said switching circuitry powers down at least a portion of said battery-operated circuitry and decouples said speaker and said microphone from said battery power source when the wireline communication link is established.

19. The telephone communication system of claim 18 wherein said switching circuitry powers down at least a portion of said battery-operated circuitry that includes said mobile station transceiver.

20. The telephone communication system of claim 18 wherein said base station further includes:

a detector to detect when the wireline communication link is established and to signal said base station transceiver to power down in response thereto.

21. The telephone communication system of claim 18 wherein said base station further comprises:

a housing; and a retracting mechanism disposed within said housing, said retracting mechanism having the cord attached thereto for controlling insertion and removal of the cord to and from said housing.

22. The telephone communication system of claim 18 further comprising at least one processor for maintaining the communication of information signals during transitions between wireless and wireline communication links.

* * * * *

UNITED STATES PATENT AND TRADEMARK OFFICE
CERTIFICATE OF CORRECTION

PATENT NO. : 6,002,937
DATED : October 31, 1996
INVENTOR(S) : Young, Jason et al.

It is certified that error appears in the above-indentified patent and that said Letters Patent is hereby corrected as shown below:

Claim 14, line 35:

Please replace "circuit" with --circuitry--.

Signed and Sealed this

Twelfth Day of September, 2000

Attest:

Attesting Officer

Q. TODD DICKINSON

Director of Patents and Trademarks